(12) United States Patent
Yamada et al.

(10) Patent No.: US 8,456,561 B2
(45) Date of Patent: Jun. 4, 2013

(54) IMAGING APPARATUS

(75) Inventors: Eiichiro Yamada, Yokohama (JP);
Hiroshi Suganuma, Yokohama (JP);
Yuji Kobayashi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 276 days.

(21) Appl. No.: 12/962,319

(22) Filed: Dec. 7, 2010

(65) Prior Publication Data

US 2011/0141315 A1 Jun. 16, 2011

(30) Foreign Application Priority Data

Dec. 14, 2009 (JP) ................................ 2009-282937

(51) Int. Cl.
*H04N 5/225* (2006.01)
(52) U.S. Cl.
USPC ............................ 348/335; 348/180; 348/370
(58) Field of Classification Search
USPC ............... 348/222.1, 180, 187, 370, 371, 335
See application file for complete search history.

(56) References Cited

U.S. PATENT DOCUMENTS 7,274,829 B2 * 9/2007 Wada et al. .................... 382/274
2008/0123103 A1 * 5/2008 Fujii .............................. 356/496

FOREIGN PATENT DOCUMENTS

JP 2001-145116 5/2001
JP 2001145116 A * 5/2001

* cited by examiner

*Primary Examiner* — Robert Velez
*Assistant Examiner* — Yih-Sien Kao
(74) *Attorney, Agent, or Firm* — Venable LLP; Michael A. Sartori; Tamatane J. Aga

(57) ABSTRACT

Provided is an imaging apparatus capable of obtaining images of an object at high precision even if the intensities of illuminating light temporally varies. The imaging apparatus 1 comprises a lamp unit 10, lens 21, a half mirror 22, a lens 23, a liquid crystal tunable filter 24, a lens 25, a reference mirror 31, a reference mirror 32, an image capturing unit 40, an operation unit 50, and a display unit 60. The reference mirrors 31 and 32 are provided at the positions to which illuminating light led by an optical system for illuminating light is irradiated and which are located at a part of the view of the image capturing unit 40. The operation unit 50 corrects the value of the image part of the object 2 by using the value of the image part of the reference mirrors 31 and 32 out of the images captured by the image capturing unit 40.

12 Claims, 7 Drawing Sheets

IMAGING APPARATUS

BACKGROUND OF THE INVENTION

1. Field of the Invention

The present invention relates to an imaging apparatus.

2. Description of the Background Art

Japanese Patent Application Publication No. 2001-145116 describes an imaging apparatus having an imaging optical system and an image capturing unit, wherein the imaging optical system images by leading light reflected from an object to which illuminating light is irradiated, and the image capturing unit captures the light thus imaged. With such an imaging apparatus, there are cases in which the intensity of reflected light incident on the image capturing unit temporally varies even if the reflected light occurs from the same object. In such cases, the precision of the object images captured by the image capturing unit becomes degraded. Also, the precision in the contrast between an object image A obtained at a certain time and an object image B obtained at another time is degraded.

SUMMARY OF THE INVENTION

The object of the present invention is to provide an imaging apparatus with which the images of an object can be obtained at high precision even if the intensities of reflected light incident onto an image capturing unit are temporally varied because of a reason not due to the object.

An imaging apparatus relating to the present invention comprises: (1) an imaging optical system to image by leading the light reflected from an object to which illuminating light is irradiated; (2) an image capturing unit for capturing the light thus imaged by the imaging optical system; (3) reference mirrors provided at positions to which illuminating light is irradiated and which are located at a part within the field of view of the image capturing unit; and (4) an operation unit which corrects the value of an image part of the object by using a value of an image part of the reference mirrors out of the images captured by the image capturing unit.

The imaging apparatus relating to the present invention exhibits its effect most conspicuously in the case where the imaging optical system includes a pass-band variable liquid crystal tunable filter on the optical path thereof. The reference mirrors are preferably arranged at two positions between which the central part of the view of the image capturing unit lies. Also, the reference mirrors are preferably provided at two positions in a direction where irregularities in the transmissivity of the liquid crystal tunable filter exist, the central part of the view of the image capturing unit being located between the two positions. The reference mirrors are preferably made of a mirror-like polished metal plate, a plate with a metallic coating, or a reflectively diffusing plate. The operation unit includes first and second operation units: the first operation unit computes a correction factor corresponding to each position of the image part of the object by using values of the image part of the reference mirrors provided at the two positions; and the second operation unit normalizes the value of each position by using the correction factor.

DETAILED DESCRIPTION OF THE INVENTION

Hereinafter, preferred embodiments for carrying out the invention will be described in detail in reference to the accompanying drawings. In the drawings, an identical mark represents the same element, and the repetition of its explanation is omitted.

Figure 1:
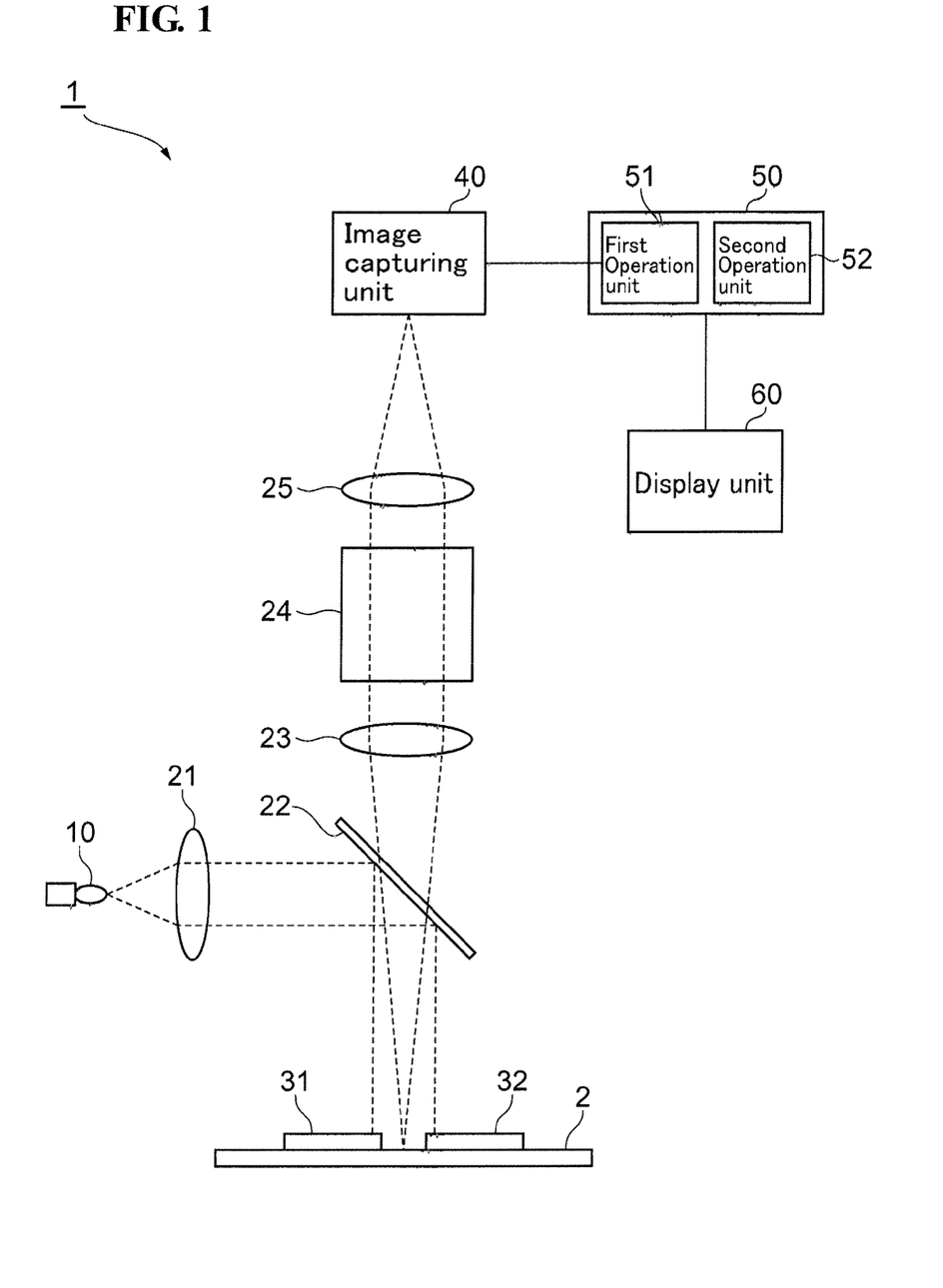
FIG. 1 is a conceptional schematic diagram of an imaging apparatus according to an embodiment of the present invention.

FIG. 1 is a conceptional schematic diagram of an imaging apparatus 1 according to an embodiment of the present invention. An imaging apparatus 1 includes a lamp unit 10, lens 21, a half mirror 22, a lens 23, a liquid crystal tunable filter 24, a lens 25, a reference mirror 31, a reference mirror 32, an image capturing unit 40, an operation unit 50, and a display unit 60.

The lamp unit 10 outputs illuminating light to be irradiated onto an object 2. The lamp unit 10 may be one for outputting narrowband light or one for outputting wide band light. In the case of the latter, a halogen lamp may be used as the lamp unit 10, for example.

The lens 21 receives the illuminating light output from the lamp unit 10 and outputs the illuminating light as parallel light to the half mirror 22. The half mirror 22 reflects onto the object 2 the illuminating light that has reached from the lens 21. Also, the half mirror 22 receives the light reflected as a result of illuminating light being irradiated onto the object 2 and allows the reflected light to pass therethrough to the lens 23. Of the light reflected at the object 2, the lens 23 and the lens 25 receive the reflected light that has passed through the half mirror 22 and image this light on the imaging face of the image capturing unit 40.

The liquid crystal tunable filter 24 is provided on the optical path between the lens 23 and the lens 25. The liquid crystal tunable filter 24 is structured such that a birefringence filter, a flat board-like liquid crystal cell, and a polarizer are stacked repeatedly in order, and the pass band can be changed by adjusting their directions.

The lens 21 and the half mirror 22 constitute an optical system for leading the illuminating light output from the lamp unit 10 to the object 2. (It is possible to adopt an embodiment in which light available in the environment is used as the illuminating light without providing the lamp unit 10. In such case, an irradiation light system may be provided according to the need.) The half mirror 22, lens 23, liquid crystal tunable filter 24, and lens 25 constitute an imaging optical system to image by leading the light reflected as a result of the illuminating light being irradiated onto the object 2.

The image capturing unit 40 captures the light imaged by the imaging optical system. A CCD camera may be used as the image capturing unit 40, for example.

The reference mirror 31 and the reference mirror 32 are provided at positions to which the illuminating light led by the optical system for illuminating light is irradiated and which are located at a part of the view of the image capturing unit 40.

The reference mirrors 31 and 32 are preferably made of a mirror-like polished metal plate, a plate with a metallic coating, or a reflectively diffusing plate. The metal used here is optional, and gold may be used, for example.

The number of the reference mirror may be one, but it is preferable that the reference mirrors 31 and 32 are provided at two positions between which the central part of the view of the image capturing unit 40 lies. Also, the reference mirrors 31 and 32 are preferably provided at two positions between which the central part of the view of the image capturing unit 40 lies and in a direction where irregularities in the transmissivity of the liquid crystal tunable filter 24 exist, so that the irregularities of the transmissivity can be corrected. (The transmissivity of the liquid crystal tunable filter 24 is often non-uniform in the whole liquid crystal area, changing in a direction.) The object 2 may be located between the reference mirror 31 and the reference mirror 32.

The operation unit 50 includes a first operation unit 51 and a second operation unit 52. The first operation unit 51 calculates a correction factor using the values of the image part of the reference mirrors 31 and 32 out of the images captured by the image capturing unit 40. The second operation unit corrects the value of the image part of the object 2 by using the correction factor. The display unit 60 displays a raw image captured by the image capturing unit 40, and also displays the image that has been corrected by the operation unit 50.

Figure 2:
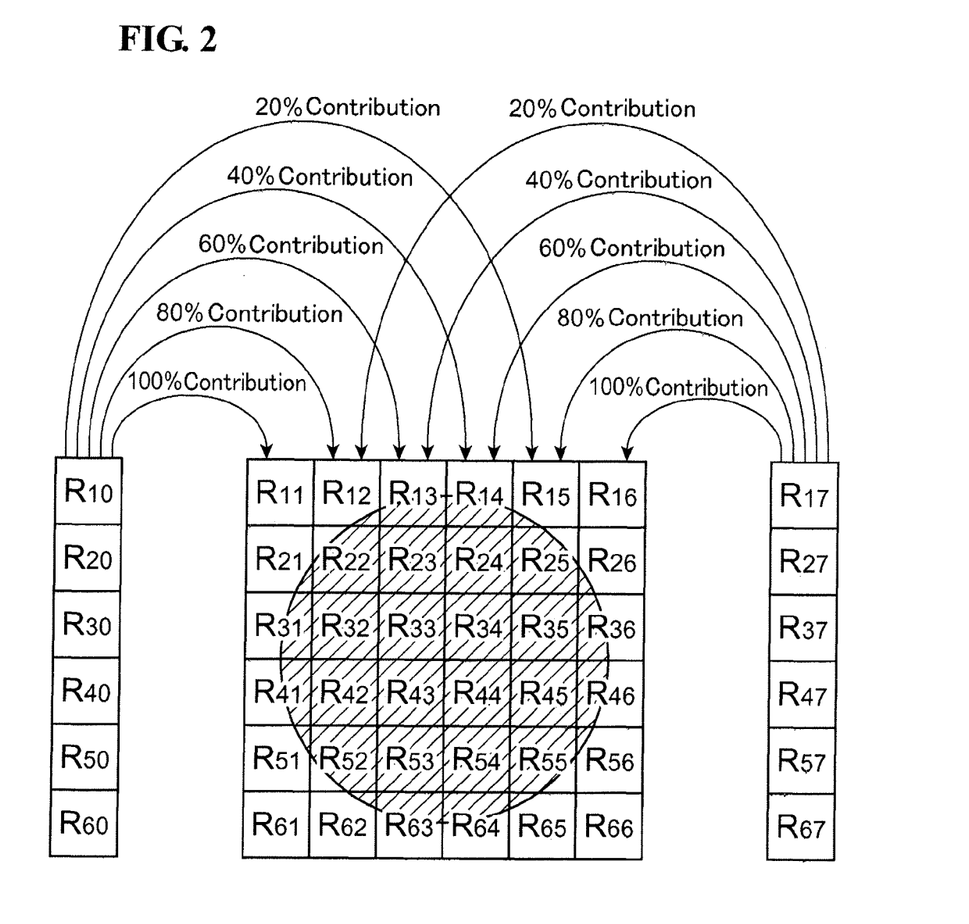
FIG. 2 is a conceptional schematic diagram illustrating an example of processing contents of the operation unit in the imaging apparatus of FIG. 1.

FIG. 2 is a conceptional schematic diagram illustrating an example of processing contents of the operation unit in the imaging apparatus of FIG. 1. The processing of the operation unit 50 is also suitable in the case where there are irregularities in the transmissivity of the liquid crystal tunable filter 24. In this example, of the images captured by the image capturing unit 40, the image part of the object 2 is divided into 6×6 regions (R11 to R16, R21 to R26, R31 to R36, R41 to 46, R51 to R56, and R61 to R66), and the image part of the reference mirror 31 is divided into six regions (R10, R20, R30, R40, R50, and R60), and the image part of the reference mirror 32 is divided into six regions (R17, R27, R37, R47, R57, and R67). The eight regions R10~R17 lie in line in this order on a straight line parallel to the direction where the irregularities of the transmissivity of the liquid crystal tunable filter 24 exist. Similarly, this applies to the eight regions R20 to R27, the eight regions R30 to R37, the eight regions R40 to R47, the eight regions R50 to R57, and the eight regions R60 to R67, respectively.

By using the value of each region (R10, R20, R30, R40, R50, R60, R17, R27, R37, R47, R57, and R67) in the image part of reference mirrors 31 and 32 out of the images captured by the image capturing unit 40, the first operation unit 51 calculates a correction factor for correcting the value of each region (R11 to R16, R21 to R26, R31 to R36, R41 to R46, R51 to R56, and R61 to R66) in the image part of the object 2. The values of regions R10 to R60 are respectively used as a correction factor for regions R11 to R61 which are most near to the reference mirror 31 in the image part of the object 2. The values of regions R17 to R67 are respectively used as a correction factor for regions R16 to R66 which are most near to the reference mirror 32 in the image part of the object 2. As for the intermediate regions (R12 to R15, R22 to R25, R32 to R35, R42 to R45, R52 to R55, and R62 to R65), the correction factors are calculated by linearly changing the values of the respective contribution of the regions R10 to R60 and those of the regions R17 to R67.

More specifically, as for the region R11, the value of the region R10 is used as a correction factor. As for the region R12, the value obtained by reflecting 80% of the value of the region R10 and 20% of the value of the region R17 (the value of region R10 multiplied by 0.8+the value of the region R17 multiplied by 0.2) is used as a correction factor. Similarly, as for the region R13, the value obtained by reflecting 60% of the value of the region R10 and 40% of the value of the region R17 is used as a correction factor. As for the region R14, the value obtained by reflecting 40% of the value of the region R10 and 60% of the value of the region R17 is used as a correction factor. Similarly, as for the region R15, the value obtained by reflecting 20% of the value of the region R10 and 80% of the value of the region R17 is used as a correction factor. Also, as for the region R16, the value of the region R17 is used as its correction factor. The above description similarly applies to the eight regions of R20 to R27, the eight regions of R30 to R37, the eight regions of R40 to R47, the eight regions of R50 to R57, and the eight regions of R60 to R67, respectively.

Then, with respect to images captured by the image capturing unit 40, the second operation unit 52 corrects the values of the regions (R11 to R16, R21 to R26, R31 to R36, R41 to R46, R51 to R56, and R61 to R66) in the image part of the object 2, normalizing them by dividing the respective values with the respective correction factors which are determined for the respective regions in the first operation unit 51.

Figure 3:
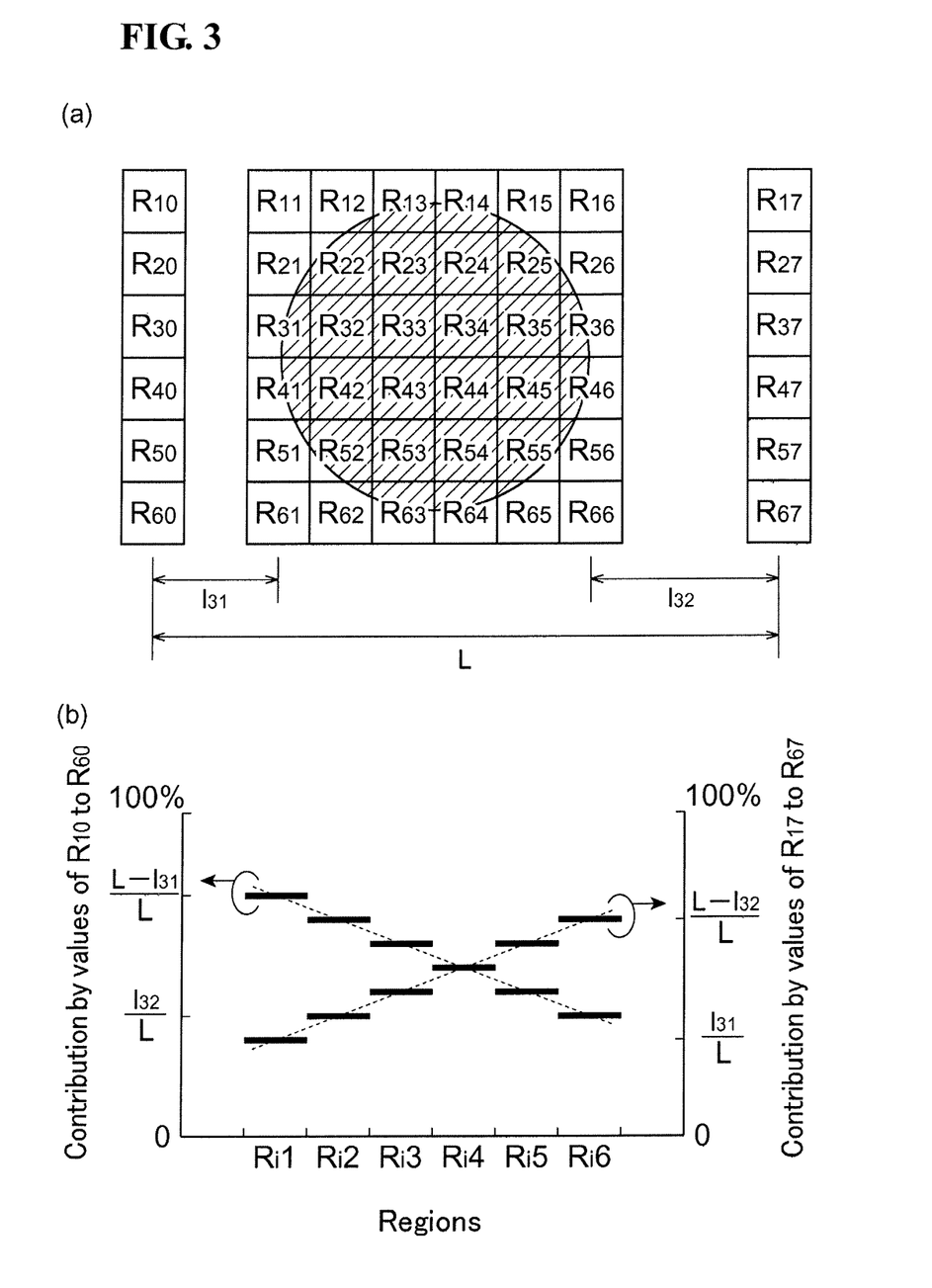
FIG. 3 is a conceptional schematic diagram illustrating another example of processing contents of the operation unit in the imaging apparatus of FIG. 1.

FIG. 3 is a conceptional schematic diagram illustrating another example of the processing contents of the operation unit in the imaging apparatus of FIG. 1. In this example also, the image part of the object 2 among the images captured by the image capturing unit 40 is divided into 6×6 regions (R11 to R16, R21 to R26, R31 to R36, R41 to R46, R51 to R56, and R61 to R66), and the image part of the reference mirror 31 is divided into six regions (R10, R20, R30, R40, R50, and R60), and the image part of the reference mirror 32 is divided into six regions (R17, R27, R37, R47, R57, and R67). The distance between the region Ri0 and the region Ri1 (i=1 to 6) is $I_{31}$, the distance between the region Ri6 and the region Ri7 (i=1 to 6) is $I_{32}$, and the distance between the region Ri0 and the region Ri7 (i=1 to 6) is L. (The distance between regions is a distance between the respective centers of the regions.)

The first operation unit 51 calculates a correction factor using the value of each region in the image part of the reference mirrors 31 and 32 among the images captured by the image capturing unit 40. With respect to the regions R11 to R61 which are most near to the reference mirror 31 in the image part of the object 2, their correction factors are values in which the contribution of individual value of the regions R10 to R60 is $(L-I_{31})/L$ and the contribution of individual value of the regions R17 to R67 is $I_{31}/L$. The correction factors for the regions R16 to R66 which are most near to the reference mirror 32 in the image part of the object 2 are values in which the contribution of individual value of the regions R10 to R60 is $(I_{32})/L$ and the contribution of individual value of the regions R17 to R67 is $(L-I_{32})/L$. As for the intermediate regions (R12 to R15, R22 to R25, R32 to R35, R42 to R45, R52 to R55, and R62 to R65), the correction factors are values obtained by linearly changing the individual contribution of the regions R11 to R61 and those of the regions R17 to R67.

Then, with respect to the images captured by the image capturing unit 40, the second operation unit 52 corrects the values of the regions (R11 to R16, R21 to R26, R31 to R36, R41 to R46, R51 to R56, and R61 to R66) in the image part of the object 2, normalizing by dividing the respective values with the respective correction factors which are determined for the respective regions in the first operation unit.

Figure 4:
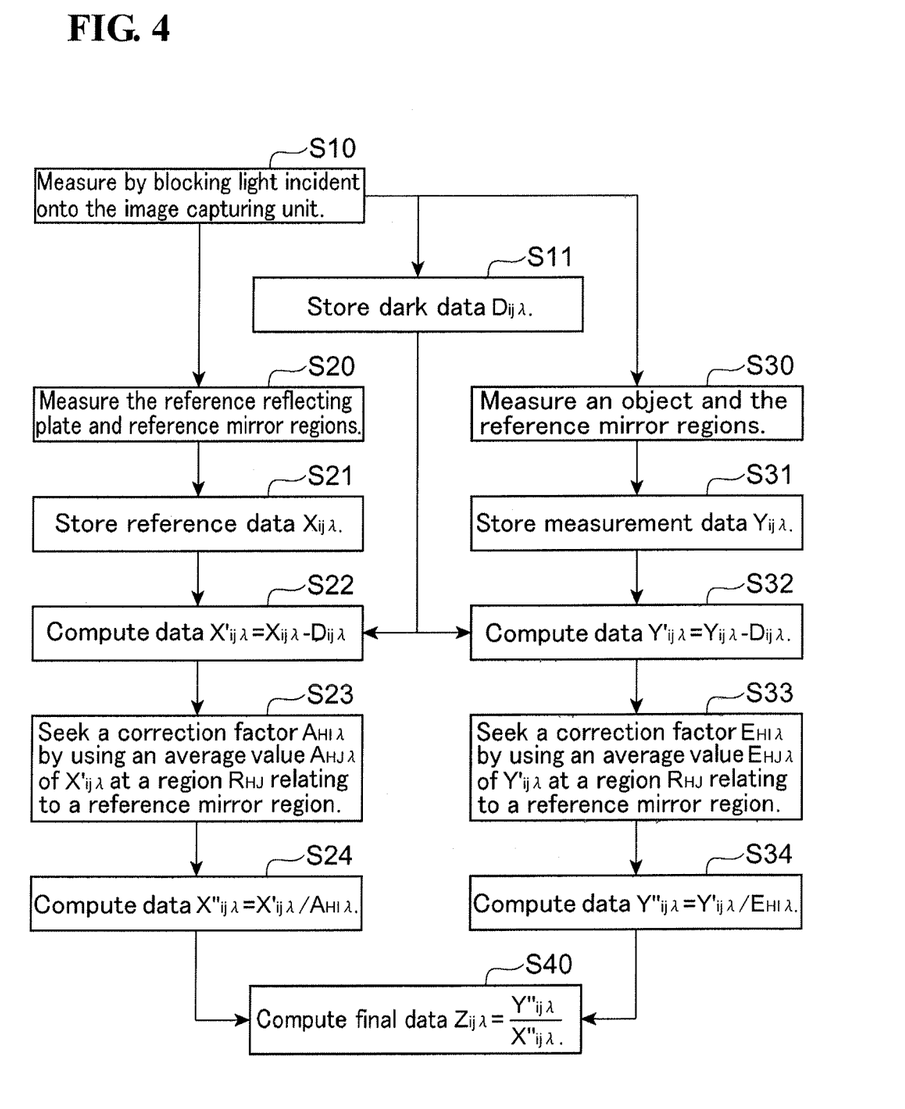
FIG. 4 is a flow chart showing a first example of operation in the imaging apparatus of FIG. 1.

FIG. 4 is a flow chart showing a first example of operation in the imaging apparatus of FIG. 1. In the first example, pixels in the image part of an object are separated into regions R11 to R66 each of which consists of m times p pixels, and pixels in the image part of the reference mirrors are separated into regions R10 to R60, R17 to R67, each of which consist of m times n pixels, and such a corrective processing as described in FIG. 2 is performed for each region. First, light incident to the image capturing unit 40 is blocked and a measurement is done (Step S10), and the dark data $D_{ij\lambda}$ thus obtained is stored (Step S11). Here, the pair of attached letters "i, j" shows a pixel position, and the attached letter $\lambda$ shows a wavelength. That is, $D_{ij\lambda}$ shows a value at wavelength $\lambda$ at a pixel position (i,j).

A reference reflecting plate is put on a measurement position, and illuminating light is irradiated to the reference reflecting plate and the reference mirrors 31 and 32, and light reflected from them is captured by the image capturing unit 40 (Step S20). Then, the reference data $X_{ij\lambda}$ thus obtained is stored (Step S21). The reference data $X_{ij\lambda}$ includes the image part of the reference reflecting plate and the image part of the reference mirrors 31 and 32. The reference reflecting plate is a thing similar to the reference mirrors 31 and 32. Subsequently, using the reference data $X_{ij\lambda}$ and the dark data $D_{ij\lambda}$, a reference data $X'_{ij\lambda}=X_{ij\lambda}-D_{ij\lambda}$ is computed as a data after a dark component is eliminated (Step S22). The average $A_{HJ\lambda}$ of the reference data $X'_{ij\lambda}$ is sought for every region $R_{HJ}$ (H=1 to 6, J=0, 7) in the image part of the reference mirrors 31 and 32. In the image part of the reference reflecting plate, a correction factor $A_{HJ\lambda}$ is calculated for every region $R_{HJ}$ (I=1 to 6) from the average $A_{HJ\lambda}$ in the manner described in FIG. 2 (Step S23). The reference data $X'_{ij\lambda}$ in the region $R_{HJ}$ is corrected with the correction factor $A_{HJ\lambda}$ (normalization), and thereby a post-correction reference data $X''_{ij\lambda}$ is obtained (Step S24).

An object 2 is put on a measurement position, and illuminating light is irradiated to the object 2 and the reference mirrors 31 and 32, and light reflected from them is captured by the image capturing unit 40 (Step S30). Then, the measurement data $Y_{ij\lambda}$ thus obtained is stored (Step S31). The measurement data $Y_{ij\lambda}$ includes the image part of the object 2 and the image part of the reference mirrors 31 and 32. Subsequently, using the measurement data $Y_{ij\lambda}$ and the dark data $D_{ij\lambda}$, a post-dark elimination measurement data $Y'_{ij\lambda}=Y_{ij\lambda}-D_{ij\lambda}$ is computed as a data obtained after a dark component is eliminated (Step S32). The average value $E_{HJ\lambda}$ of the measurement data $Y'_{ij\lambda}$ is sought for every region $R_{HJ}$ (H=1 to 6, J=0, 7) in the image part of the reference mirrors 31 and 32. In the image part of the object 2, a correction factor $E_{HJ\lambda}$ is calculated for every region $R_{HJ}$ (I=1 to 6) from the average value $E_{HJ\lambda}$ in the manner described in FIG. 2 (Step S33). The measurement data $Y'_{ij\lambda}$ in the region $R_{HJ}$ is corrected with the correction factor $E_{HJ\lambda}$ (normalization), and thereby a post-correction measurement data $Y''_{ij\lambda}$ is obtained (Step S34).

Then, a final data $Z_{ij\lambda}=Y''_{ij\lambda}/X''_{ij\lambda}$ is computed using the post-correction reference data $X''_{ij\lambda}$ and the post-correction measurement data $Y''_{ij\lambda}$ (Step S40). The data $Z_{ij\lambda}$ are data in which a dark elimination (Steps S22 and S32), a correction regarding temporal change in the intensity of illuminating light (Steps S23, S24, S33, and S34), and a correction about irregularities between pixels (Step S40) have been done.

Figure 5:
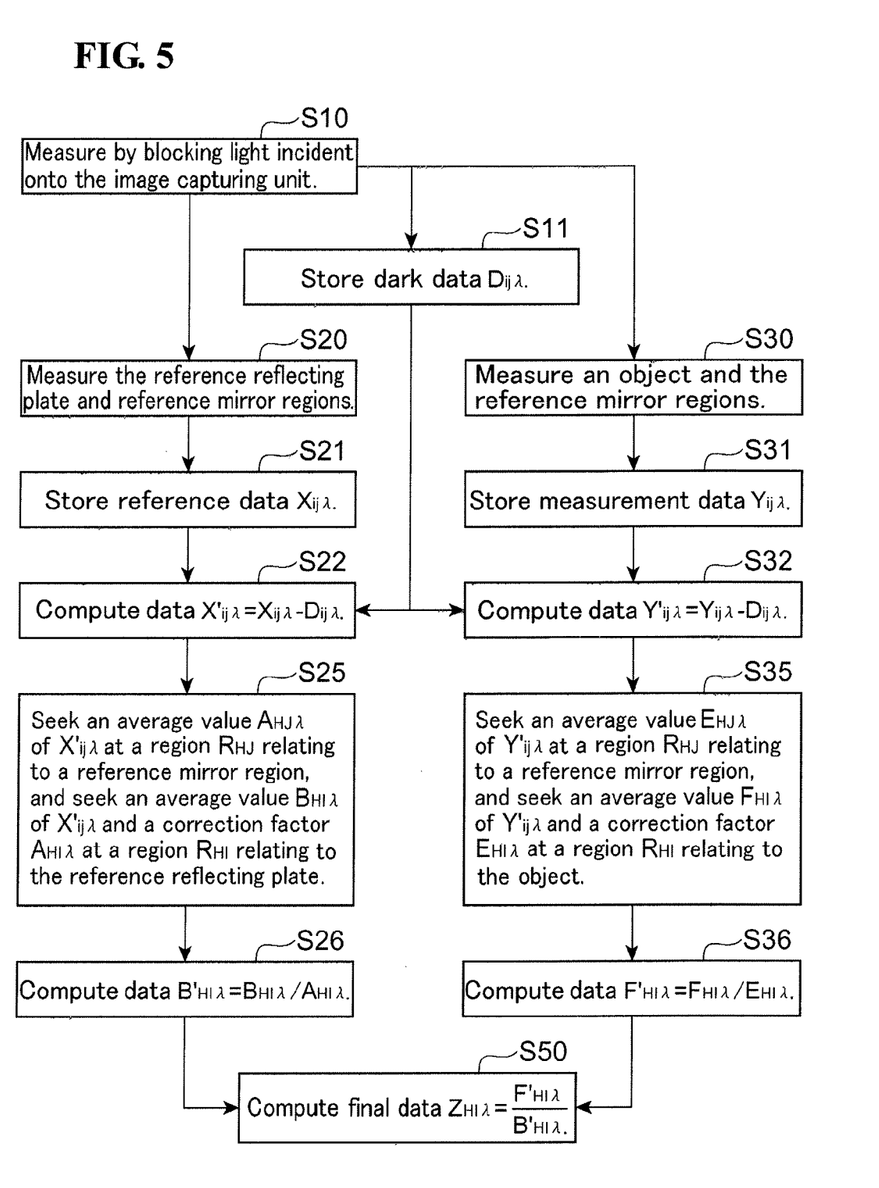
FIG. 5 is a flow chart showing a second example of operation in the imaging apparatus of FIG. 1.

FIG. 5 is a flow chart showing a second example of operation in the imaging apparatus of FIG. 1. In the second example also, pixels in the image part of an object are separated into regions R11 to R66, and pixels in the image part of the reference mirrors are separated into regions R10 to R60, R17 to R67, and such a corrective processing as described in FIG. 2 is performed for each region. The steps S10, S11, S20 to S22, and S30 to S32 of the second example are the same as the first example.

After the calculation of the post-dark elimination reference data $X'_{ij\lambda}$ (Step S22), in the image part of the reference mirrors 31 and 32 out of the reference data $X'_{ij\lambda}$, an average value $A_{HJ\lambda}$ of the reference data $X'_{ij\lambda}$ is obtained for every region $R_{HJ}$ (H=1 to 6, J=0, 7), and also in the image part of the reference reflecting plate out of the reference data $X'_{ij\lambda}$, an average value $B_{HJ\lambda}$ of the reference data $X'_{ij\lambda}$ is obtained for every region $R_{HJ}$ (I=1 to 6) (Step S25), and the data $B_{HJ\lambda}$ is corrected using a correction factor $A_{HJ\lambda}$ calculated for every region $R_{HJ}$ by using the average value $A_{HJ\lambda}$ (normalization), and thereby a post-correction reference data $B'_{HJ\lambda}$ is obtained (Step S26).

After the calculation of the post-dark elimination measurement data $Y'_{ij\lambda}$ (Step S32), in the image part of the reference mirrors 31 and 32 out of the measurement data $Y'_{ij\lambda}$, an average value $E_{HJ\lambda}$ of the measurement data $Y'_{ij\lambda}$ is obtained for every region $R_{HJ}$ (H=1 to 6, J=0, 7), and also in the image part of the object 2 out of the measurement data $Y'_{ij\lambda}$, an average value $F_{HJ\lambda}$ of the measurement data $Y'_{ij\lambda}$ is obtained for every region $R_{HJ}$ (I=1 to 6) (Step S35), and the data $F_{HJ\lambda}$ is corrected using a correction factor $E_{HJ\lambda}$ calculated for every region $R_{HJ}$ by using the average value $E_{HJ\lambda}$ (normalization), and thereby a post-correction measurement data $F'_{HJ\lambda}$ is obtained (Step S36).

Then a final data $Z_{HJ\lambda}=F'_{HJ\lambda}/B'_{HJ\lambda}$ is computed by using the post-correction reference data $B'_{HJ\lambda}$ and the post-correction measurement data $F'_{HJ\lambda}$ (Step S50). The data $Z'_{ij\lambda}$ are data in which a dark elimination (Steps S22 and S32), a correction regarding temporal change in the intensity of illuminating light (Steps S25, S26, S35, and S36), and a correction about irregularities between pixels (Step S50) have been done.

Figure 6:
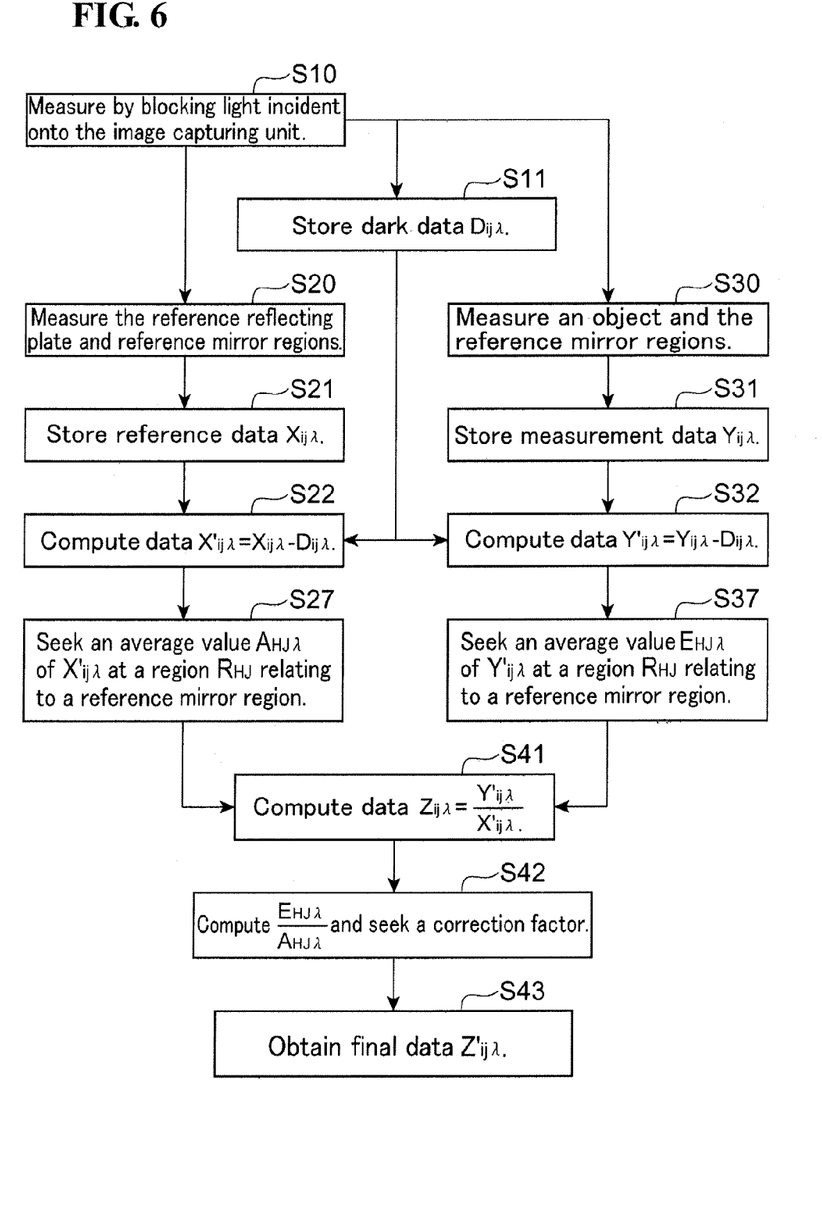
FIG. 6 is a flow chart showing a third example of operation in the imaging apparatus of FIG. 1.

FIG. 6 is a flow chart showing a third example of operation in the imaging apparatus of FIG. 1. In the third example also, pixels in the image part of an object are separated into regions R11 to R66, and pixels in the image part of the reference mirrors are separated into regions R10 to R60, R17 to R67, and such a corrective processing as described in FIG. 2 is performed for each region. The steps S10, S11, S20 to S22, and S30 to S32 of the third example are the same as the first example.

In the third example, in the image part of the reference mirrors 31 and 32, an average value $A_{HJ\lambda}$ of the post-dark elimination reference data $X'_{ij\lambda}$ and an average value $E_{HJ\lambda}$ of the post-dark elimination measurement data $Y'_{ij\lambda}$ are computed for every region $R_{HJ}$ (H=1 to 6, J=0, 7) (Steps S27 and S37). The ratio between the measurement data and the reference data ($Z_{ij\lambda}=Y'_{ij\lambda}/X'_{ij\lambda}$) is computed with respect to (i, j) which becomes an image part of the object 2 (Step S41). On the other hand, a correction factor is calculated for every region $R_{HJ}$ (I=1 to 6) from the ratio $E_{HJ\lambda}/A_{HJ\lambda}$ of the average value $E_{HJ\lambda}$ to the average value $A_{HJ\lambda}$ in the manner described in FIG. 2 (Step S42). Finally, $Z'_{ij\lambda}$ is obtained by normalizing $Z_{ij\lambda}$ with the correction factor.

Figure 7:
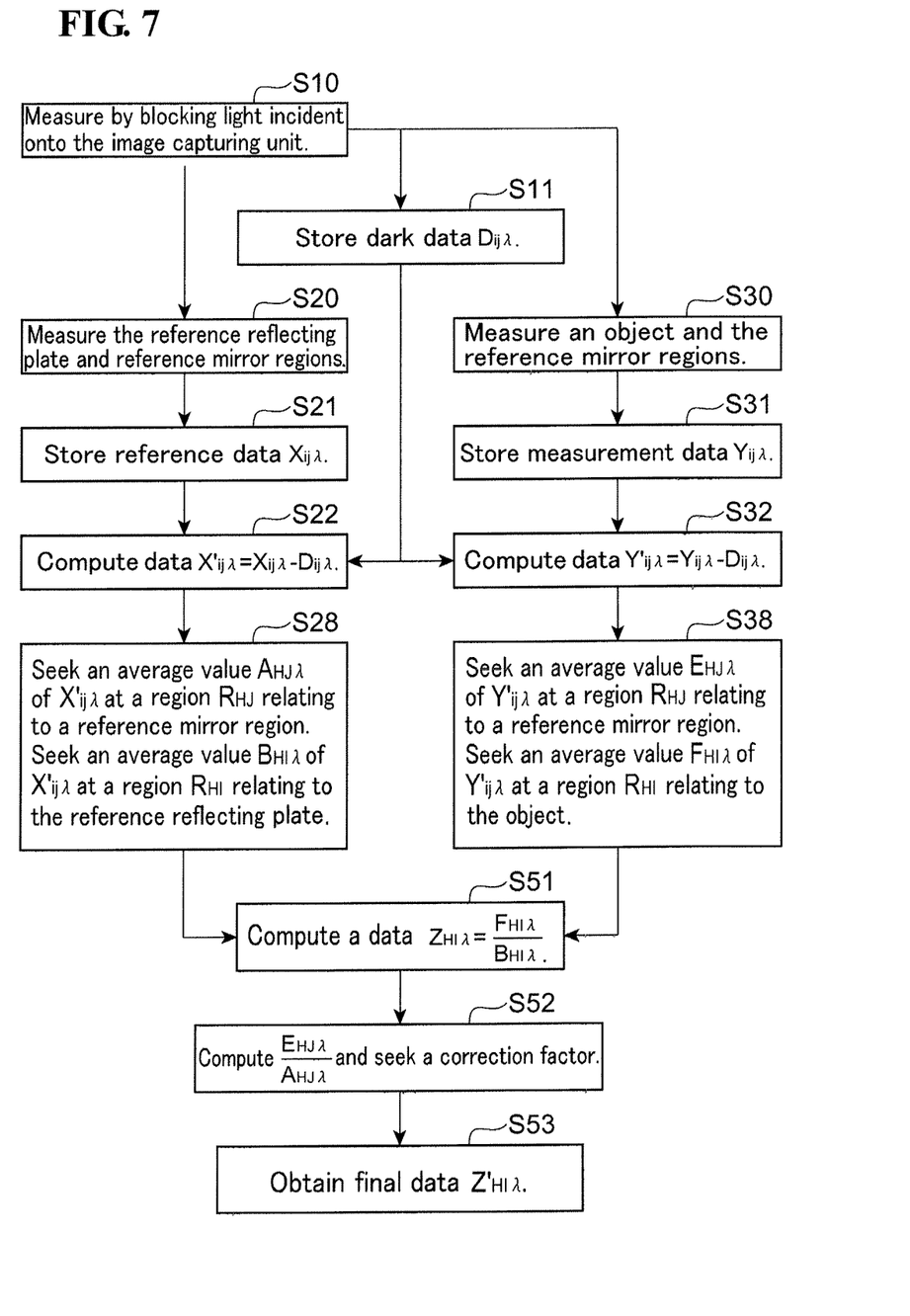
FIG. 7 is a flow chart showing a fourth example of operation in the imaging apparatus of FIG. 1.

FIG. 7 is a flow chart showing a fourth example of operation in the imaging apparatus of FIG. 1. In the fourth example also, pixels in the image part of an object are separated into regions R11 to R66, and pixels in the image part of the reference mirrors are separated into regions R10 to R60, R17 to R67, and such a corrective processing as described in FIG. 2 is performed for each region. The steps S10, S11, S20 to S22, and S30 to S32 of the fourth example are the same as the first example.

In the fourth example, with respect to the post-dark elimination reference data $X'_{ij\lambda}$, in the image part of the reference mirrors 31 and 32, an average value $A_{HJ\lambda}$ is computed for every region $R_{HJ}$ (H=1 to 6, J=0, 7), and in the image part of the reference reflecting plate, an average value $B_{HJ\lambda}$ (I=1 to 6)

is computed for every region $R_{HI}$ (Step S28). Also, with respect to the post-dark elimination measurement data $Y'_{ij\lambda}$, in the image part of the reference mirrors 31 and 32, an average value $E_{HJ\lambda}$ is computed for every region $R_{HJ}$, and in the image part of the object 2, an average value $F_{HI\lambda}$ is computed for every region $R_{HI}$ (Step S38). Moreover, the ratio between the average $F_{HI\lambda}$ and the average $B_{HI\lambda}$ ($Z_{HI\lambda}=F_{HI\lambda}/B_{HI\lambda}$) is computed (Step S51), and also a correction factor is calculated for every region $R_{HI}$ (I=1 to 6) from the ratio $E_{HJ\lambda}/A_{HJ\lambda}$ of the average $E_{HJ\lambda}$ to the average $A_{HJ\lambda}$ in the manner described in FIG. 2 (Step S52). Finally, the ratio $Z'_{ij\lambda}$ is obtained by normalizing $Z_{ij\lambda}$ with the correction factor.

As described above, the imaging apparatus 1 according to the present embodiment has reference mirrors provided at positions to which illuminating light is irradiated and which are located at a part of the view of the image capturing unit, and consequently, even if the intensity of the illuminating light output from the lamp unit 10 changes temporally, the image of the object 2 can be obtained at high precision as a result of correction performed by the operation unit 50.

The examples described in the above explanation are such that the reference mirror region is divided into six regions (six lines one column) and the image part of an object is divided into 6×6 regions (six lines, six columns). However, the number of lines can be an arbitrary number depending on the size of the object and the necessary precision of measurement. Also, the number of the columns for the image part of the object can be an optional number. Moreover, the correction described in FIG. 3 can be used instead of the correction described in FIG. 2 with respect to the first to fourth examples.

What is claimed is:

1. An imaging apparatus comprising:
   an imaging optical system to image by leading light reflected from an object to which illuminating light is irradiated;
   an image capturing unit for capturing the light thus imaged by the imaging optical system;
   reference mirrors provided at positions to which illuminating light is irradiated and which are located at a part within the field of view of the image capturing unit; and
   an operation unit which, by using a value of an image part of the reference mirrors, corrects the value of an image part of the object out of the images captured by the image capturing unit.

2. An imaging apparatus according to claim 1,
   wherein the imaging optical system includes a pass-band variable liquid crystal tunable filter on the optical path thereof.

3. An imaging apparatus according to claim 1,
   wherein the reference mirrors are arranged at two positions between which the central part of the view of the image capturing unit lies.

4. An imaging apparatus according to claim 2,
   wherein the reference mirrors are provided at two positions in a direction where irregularities in the transmissivity of the liquid crystal tunable filter exist, the central part of the view of the image capturing unit being located between the two positions.

5. An imaging apparatus according to claim 1, wherein the reference mirrors are made of a mirror-like polished metal plate.

6. An imaging apparatus according to claim 1, wherein the reference mirrors are made of a plate with a metallic coating.

7. An imaging apparatus according to claim 3,
   wherein the operation unit comprises first and second operation units, the first operation unit computing a correction factor corresponding to each position of the image part of the object by using the value of the image part of the reference mirrors provided at the two positions, the second operation unit normalizing the value of each position by using the correction factor.

8. An imaging apparatus comprising:
   an imaging optical system to image by leading light reflected from an object to which illuminating light is irradiated;
   an image capturing unit for capturing the light thus imaged by the imaging optical system;
   reflectively diffusing plates provided at positions to which illuminating light is irradiated and which are located at a part within the field of view of the image capturing unit; and
   an operation unit which, by using a value of an image part of the reflectively diffusing plates, corrects the value of an image part of the object out of the images captured by the image capturing unit.

9. An imaging apparatus according to claim 8, wherein the imaging optical system includes a pass-band variable liquid crystal tunable filter on the optical path thereof.

10. An imaging apparatus according to claim 8, wherein the reflectively diffusing plate are arranged at two positions between which the central part of the view of the image capturing unit lies.

11. An imaging apparatus according to claim 9, wherein the reflectively diffusing plates are provided at two positions in a direction where irregularities in the transmissivity of the liquid crystal tunable filter exist, the central part of the view of the image capturing unit being located between the two positions.

12. An imaging apparatus according to claim 10,
    wherein the operation unit comprises first and second operation units, the first operation unit computing a correction factor corresponding to each position of the image part of the object by using the value of the image part of the reflectively diffusing plates provided at the two positions, the second operation unit normalizing the value of each position by using the correction factor.

* * * * *